(12) United States Patent
Chapman et al.

(10) Patent No.: US 10,369,740 B2
(45) Date of Patent: Aug. 6, 2019

(54) METHOD OF FORMING A CONTOURED HAT STIFFENER

(71) Applicant: The Boeing Company, Chicago, IL (US)

(72) Inventors: Michael Robert Chapman, Federal Way, WA (US); Gordon Dale Davis, Marysville, WA (US)

(73) Assignee: The Boeing Company, Chicago, IL (US)

( * ) Notice: Subject to any disclaimer, the term of this patent is extended or adjusted under 35 U.S.C. 154(b) by 576 days.

(21) Appl. No.: 14/795,354

(22) Filed: Jul. 9, 2015

(65) Prior Publication Data

US 2017/0008217 A1    Jan. 12, 2017

(51) Int. Cl.
| | |
|---|---|
| *B29C 51/08* | (2006.01) |
| *B29C 51/42* | (2006.01) |
| *B29C 70/46* | (2006.01) |
| *B29D 99/00* | (2010.01) |
| *B29C 70/56* | (2006.01) |

(Continued)

(52) U.S. Cl.
CPC ............ *B29C 51/085* (2013.01); *B29C 51/12* (2013.01); *B29C 51/421* (2013.01); *B29C 70/462* (2013.01); *B29C 70/56* (2013.01); *B29D 99/0003* (2013.01); *B29K 2105/08* (2013.01); *B29K 2105/256* (2013.01); *B29L 2009/00* (2013.01); *B29L 2031/001* (2013.01); *B29L 2031/003* (2013.01); *Y02T 50/43* (2013.01)

(58) Field of Classification Search
CPC ..... B29C 51/085; B29C 51/12; B29C 51/421; B29C 70/56; B29C 70/462; B29D 99/0003; Y02T 50/433; B29K 2105/256; B29K 2105/08; B29L 2031/003; B29L 2009/00; B29L 2031/001
USPC ........................................................ 264/322
See application file for complete search history.

(56) References Cited

U.S. PATENT DOCUMENTS

| | | |
|---|---|---|
| 1,433,879 A | 10/1922 | Fancher et al. |
| 1,965,716 A | 7/1934 | Thoms et al. |

(Continued)

FOREIGN PATENT DOCUMENTS

| | | |
|---|---|---|
| CA | 2487697 A1 | 5/2006 |
| DE | 742682 C | 12/1943 |

(Continued)

OTHER PUBLICATIONS

"A Composite Preform", IP.com Prior Art Database Technical Disclosure No. IPCOM000007326D, dated Mar. 14, 2002, http://www.ip.com/IPCOM/000007326, 4 pages.

(Continued)

*Primary Examiner* — Michael N Orlando
*Assistant Examiner* — Christian Roldan
(74) *Attorney, Agent, or Firm* — Yee & Associates, P.C.

(57) ABSTRACT

A flexible punch and die are used to form a flat composite laminate charge into a stiffener having a desired cross sectional shape. A desired contour is formed in the stiffener by bending the punch and die. Ply wrinkling is avoided during contouring by maintaining those portions of the stiffener subject to wrinkling in tension as the contouring is being performed. Bridging of the plies during the contouring process is avoided by first contouring those sections of the stiffener that are subject to wrinkling, and then contouring the remaining sections of the stiffener.

13 Claims, 13 Drawing Sheets

(51) Int. Cl.
*B29C 51/12* (2006.01)
*B29L 31/00* (2006.01)
*B29K 105/08* (2006.01)
*B29K 105/00* (2006.01)
*B29L 9/00* (2006.01)

(56) References Cited

U.S. PATENT DOCUMENTS

| | | | |
|---|---|---|---|
| 3,693,924 | A | 9/1972 | Blatherwick |
| 3,843,756 | A | 10/1974 | Talbott et al. |
| 3,990,291 | A | 11/1976 | Evertz et al. |
| 4,254,735 | A | 3/1981 | Postupack et al. |
| 4,270,964 | A | 6/1981 | Flaskett |
| 4,338,070 | A | 7/1982 | Nava |
| 4,366,698 | A | 1/1983 | Gill |
| 4,367,644 | A | 1/1983 | Kramer et al. |
| 4,475,976 | A * | 10/1984 | Mittelstadt ............ B29C 70/342 100/211 |
| 4,504,341 | A | 3/1985 | Radzwill et al. |
| 4,614,558 | A | 9/1986 | Kobe |
| 4,657,717 | A | 4/1987 | Cattanach et al. |
| 4,946,526 | A * | 8/1990 | Petty-Galis ........... B29C 33/448 156/155 |
| 4,980,013 | A | 12/1990 | Lowery |
| 5,022,248 | A | 6/1991 | Brooks et al. |
| 5,108,532 | A | 4/1992 | Thein et al. |
| 5,188,787 | A | 2/1993 | King et al. |
| 5,200,133 | A * | 4/1993 | Dieul ................... B29C 33/0055 264/102 |
| 5,286,438 | A | 2/1994 | Dublinski et al. |
| 5,304,057 | A | 4/1994 | Celerier et al. |
| 5,327,764 | A | 7/1994 | Weykamp et al. |
| 5,366,431 | A | 11/1994 | Smith et al. |
| 5,366,684 | A | 11/1994 | Corneau, Jr. |
| 5,464,337 | A | 11/1995 | Bernardon et al. |
| 5,582,058 | A | 12/1996 | Knudson |
| 5,707,576 | A | 1/1998 | Asher |
| 5,714,179 | A | 2/1998 | Goodridge et al. |
| 5,772,950 | A | 6/1998 | Brustad et al. |
| 5,846,464 | A | 12/1998 | Hoffman |
| 5,882,462 | A * | 3/1999 | Donecker ................ B27N 3/10 156/205 |
| 6,089,061 | A | 7/2000 | Haas et al. |
| 6,139,942 | A | 10/2000 | Hartness et al. |
| 6,299,819 | B1 | 10/2001 | Han |
| 6,558,590 | B1 | 5/2003 | Stewart |
| 6,723,272 | B2 | 4/2004 | Montague et al. |
| 6,749,784 | B2 | 6/2004 | Blanchon |
| 6,814,916 | B2 * | 11/2004 | Willden ................... B29C 43/12 264/257 |
| 6,855,284 | B2 | 2/2005 | Lanni et al. |
| 6,929,770 | B2 | 8/2005 | Caldwell, Jr. |
| 7,091,300 | B2 | 8/2006 | Luhmann et al. |
| 7,118,370 | B2 | 10/2006 | Willden et al. |
| 7,141,199 | B2 | 11/2006 | Sana et al. |
| 7,306,450 | B2 | 12/2007 | Hanson |
| 7,464,508 | B2 | 12/2008 | Fournie et al. |
| 7,527,759 | B2 | 5/2009 | Lee et al. |
| 7,622,066 | B2 | 11/2009 | Brustad et al. |
| 7,655,168 | B2 | 2/2010 | Jones et al. |
| 7,708,546 | B2 | 5/2010 | Lee et al. |
| 7,713,603 | B2 | 5/2010 | Farran et al. |
| 7,959,753 | B2 | 6/2011 | Nunez Delgado et al. |
| 8,465,613 | B2 * | 6/2013 | Rotter ................... B29C 70/462 156/212 |
| 8,551,382 | B2 | 10/2013 | Anderson et al. |
| 8,557,165 | B2 | 10/2013 | Jones et al. |
| 8,601,694 | B2 | 12/2013 | Brennan et al. |
| 2004/0043196 | A1 | 3/2004 | Willden et al. |
| 2004/0265536 | A1 | 12/2004 | Sana et al. |
| 2005/0142239 | A1 | 6/2005 | Frank |
| 2006/0231981 | A1 | 10/2006 | Lee et al. |
| 2007/0039284 | A1 | 2/2007 | Munoz Royo et al. |
| 2009/0297358 | A1 | 12/2009 | Anderson et al. |
| 2009/0320292 | A1 | 12/2009 | Brennan et al. |
| 2010/0074979 | A1 | 3/2010 | Cundiff et al. |
| 2010/0102482 | A1 | 4/2010 | Jones et al. |
| 2011/0195230 | A1 | 8/2011 | Hanson |
| 2013/0049258 | A1 | 2/2013 | Roffer et al. |
| 2013/0340928 | A1 | 12/2013 | Roffer et al. |
| 2014/0103585 | A1 * | 4/2014 | Coxon ................... B29C 70/446 264/544 |
| 2014/0203477 | A1 | 7/2014 | Chapman et al. |

FOREIGN PATENT DOCUMENTS

| | | |
|---|---|---|
| DE | 4234002 A1 | 4/1994 |
| DE | 19536675 C1 | 2/1997 |
| EP | 0659541 A1 | 6/1995 |
| EP | 1136239 A2 | 9/2001 |
| EP | 1393873 A2 | 3/2004 |
| EP | 1439121 A2 | 7/2004 |
| EP | 1481790 A2 | 12/2004 |
| EP | 1972428 A2 | 9/2008 |
| EP | 2128019 A1 | 12/2009 |
| EP | 2133263 A2 | 12/2009 |
| EP | 2561979 A2 | 2/2013 |
| FR | 2035314 A5 | 12/1970 |
| FR | 2667013 A1 | 3/1992 |
| FR | 2771332 A1 | 5/1999 |
| FR | 2844472 A1 | 3/2004 |
| GB | 2139934 A | 11/1984 |
| JP | 61043542 A | 3/1986 |
| JP | 2001310798 A | 11/2001 |
| JP | 2004352187 A | 12/2004 |
| WO | 2004025003 A2 | 3/2004 |
| WO | 2005095091 A1 | 10/2005 |
| WO | 2006014825 A1 | 2/2006 |
| WO | 2006039124 A2 | 4/2006 |
| WO | 2006048652 A1 | 5/2006 |
| WO | 2006113048 A2 | 10/2006 |
| WO | 2007134790 A1 | 11/2007 |
| WO | 2010047980 A1 | 4/2010 |

OTHER PUBLICATIONS

Ando et al., "Growing Carbon Nanotubes," Materials Today, Oct. 2004, vol. 7, No. 10, pp. 22-29.

Brittles, "New Developments in Resin Transfer Moulding," Proc. 19th International Composites Congress, Nov. 1994, pp. 11-26.

Garcia et al., "Hybrid Carbon Nanotube-Composite Architectures," MTL Annual Research Report, Sep. 2006, p. 208.

Growing Carbon Nanotubes Aligned With Patterns, NASA Tech Briefs No. NPO-30205, Oct. 2002, http://nasatech.com/Briefs/Oct02/NPO30205.html, 2 pages.

Musch et al., "Tooling With Reinforced Elastomeric Materials," Composites Manufacturing, 1992, vol. 3, No. 2, pp. 101-111.

The Longest Carbon Nanotubes You Have Ever Seen, http://www.spacemart.com/reports/The_Longest_Carbon_Nanotubes_You_Have_Ever_Seen_999.html, May 14, 2007, 1 page.

"The Wondrous World of Carbon Nanotubes", Eindhoven University of Technology, Feb. 27, 2003, 26 pages. http://students.chem.tue.nl/ifp03/Wondrous%20World%20of%20Carbon%20Nanotubes_Final.pdf.

Extended European Search Report, dated Dec. 5, 2016, regarding Application No. EP16164314.3, 6 pages.

* cited by examiner

METHOD OF FORMING A CONTOURED HAT STIFFENER

BACKGROUND INFORMATION

1. Field

The present disclosure generally relates to the fabrication of composite stiffeners, and deals more particularly with a method and apparatus for reducing wrinkling of contoured hat-type stiffeners formed from a single composite charge.

2. Background

Composite stiffeners such as spars and stringers are used in a wide range of aerospace, marine and other applications. In some cases, stiffeners must be contoured along their length to conform to the geometry of a structure, such as an aircraft wing or fuselage skin.

One technique for fabricating contoured composite stiffeners involves punch forming a composite laminate charge into a straight stiffener, and contouring the straight stiffener by placing a contourable vacuum fixture inside the stiffener. Vacuum is applied to the vacuum fixture and the stiffener is then transferred to a female cure tool having a desired stiffener contour. This approach is labor intensive and adds to tooling costs.

More recently, it has been proposed to fabricate contoured composite stiffeners, such as stringers, using punch forming in which a flat composite laminate charge is punched formed into a die to achieve the desired cross-sectional shape. Both the punch and the die are articulated along their lengths, allowing them to bend. Once the charge has been punch formed to the desired cross-sectional shape, the punch and the die are forced to bend, thereby forming the stiffener to the desired contour. Problems arise, however, where the composite stiffener is highly contoured. As the formed charge is bent to the desired contour, portions of the charge, such as the webs in a hat stiffener, are placed in compression, resulting in undesired wrinkling of some of the plies of the charge. Hand rework of the stiffeners is required to eliminate the wrinkling, adding to labor costs and reducing production rate.

Accordingly, there is a need for a method and apparatus that allow punch forming of highly contoured composite stiffeners, such as hat stringers, which substantially reduce or eliminate ply wrinkling caused by material compression as the stiffener is formed to the desired contour.

SUMMARY

The disclosed embodiments provide a method and apparatus for fabricating substantially wrinkle-free, highly contoured composite laminate stiffeners. The stiffeners are punch formed from a single composite charge and then contoured along their lengths. A portion of the shaped stiffener is pinched and thereby compressed, as the shaped composite charge is being contoured. The compression of a portion of the charge causes the remainder of the stiffener to be placed in tension which prevents plies of the stiffener from wrinkling as the stiffener is being contoured. In one variation of the method, the stiffener may be sequentially contoured along its length, beginning at the apex of the intended contour, in order to reduce or eliminate possible bridging of the plies during contouring.

According to one disclosed embodiment, a method is provided of forming a contoured hat-shaped composite stiffener having a cap, a pair of flanges and a pair of webs connecting the cap with the flanges. The method includes placing a generally flat composite laminate charge on a die having a die cavity in which the cap and the webs may be formed. The method also includes forming the cap and the webs using a punch to drive the charge into the die cavity. A portion of the charge is placed in tension by compressing either the flanges or the cap. A contour is formed into a composite charge while the portion of the charge is being held in tension. Maintaining tension on a portion of the charge during contouring substantially reduces or eliminates ply wrinkling.

According to another disclosed embodiment, a method is provided of forming a hat-shaped composite stiffener contoured along its length. The method includes placing a flat composite charge on a die, and punch forming the composite charge between the die and a punch into a generally straight stiffener having a hat-shaped cross-section. The method also includes forming a contour in the straight stiffener by first forming a portion of the contour in an intermediate section of the straight stiffener and then forming the other sections of the contour. The forming operation may be performed in a sequential manner in which contouring of the stiffener is first performed at the apex of the contour, followed by contouring of the remainder of the stiffener.

According to still another disclosed embodiment, apparatus is provided for forming a hat stiffener contoured along its length, wherein the hat stiffener includes a pair of webs connecting a cap with a pair of flanges. The apparatus includes a die adapted to have a composite charge placed thereon. The die includes first and second spaced apart die members defining a die cavity therebetween. The apparatus also includes a punch adapted to be driven into the die cavity for forming a portion of the composite charge into the cap and the webs. The apparatus also includes a former device for forming the contour into the hat stiffener after the hat stiffener has been punch formed. The apparatus further includes a device for reducing wrinkling of the webs as the former is bending the contour into the hat stiffener. The device includes at least one pressure plate adapted to compress a portion of the composite charge.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
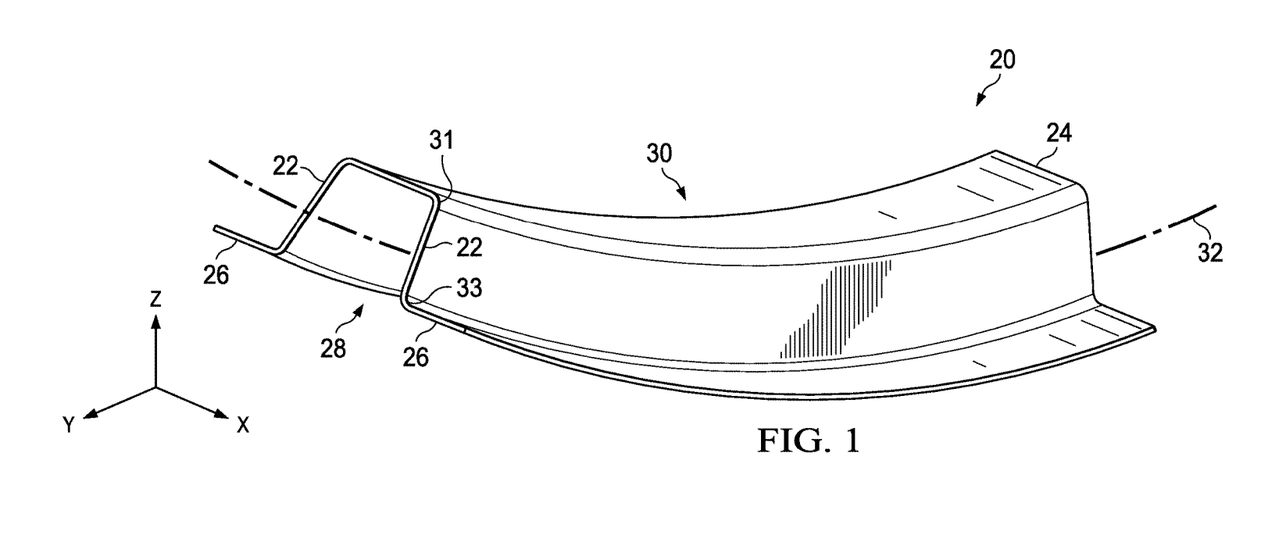
FIG. 1 is an illustration of a perspective view of a composite hat stiffener having a concave contour.

Referring first to FIG. 1, the disclosed embodiments described below may be employed to fabricate a stiffener 20 having a hat-shaped cross-section and a curved longitudinal axis 32. Stiffener 20 is referred to using various terms throughout this description. Stiffener 20 is referred to herein as, but not limited to, hat stiffener, contoured composite laminate stiffener, straight stiffener, composite stiffener, composite laminate stiffener, straight composite laminate stiffener, concave shaped stiffener, straight hat stiffener, convex shaped stiffener, contoured hat-shaped composite stiffener, contoured stiffener, and generally straight stiffener. These various terms all refer to stiffener 20. Different adjectives are associated with the various terms to describe stiffener 20 at various stages as stiffener 20 is shaped. The hat stiffener 20 includes a hat section 28 comprising a pair of webs 22 that connect a cap 24 with a pair of flanges 26. The cap 24 is connected with the webs 22 along radius corners 31, while the flanges 26 are connected with the webs 22 along radius corners 33. The hat stiffener 20 is contoured 30 in the YZ plane throughout its length. In this example, the stiffener 20 has a concave contour 30, wherein cap 24 is located on the inside radius of the stiffener 20. In other examples, the hat stiffener 20 may be contoured at one or more locations anywhere along its length. For example, the hat stiffener 20 may be contoured only in an intermediate section, or contoured only at its outer ends.

Figure 2:
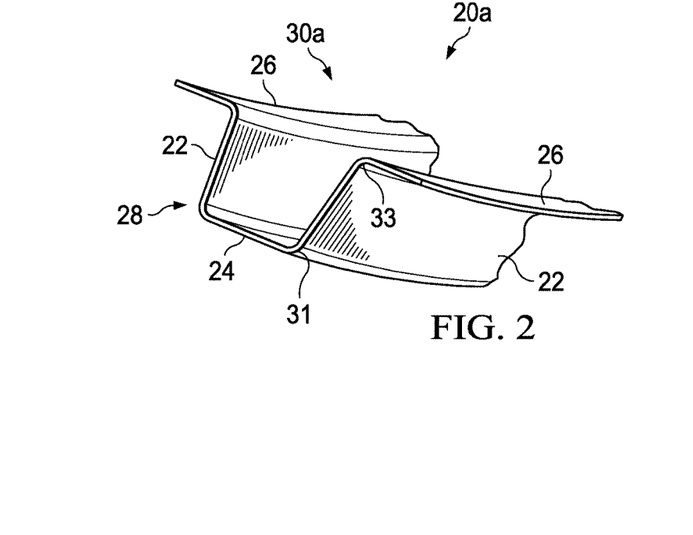
FIG. 2 is an illustration similar to FIG. 1 but showing one end of a composite hat stiffener having a convex contour.

As will be discussed below in more detail, the hat stiffener 20 may be formed from a single composite laminate charge of fiber reinforced plies, such as, without limitation, carbon fiber reinforced plastic. FIG. 2 illustrates an alternate form of a hat stiffener 20a that may be produced according to the disclosed embodiments, that possesses a contour 30a wherein the flanges 26 are on the inside radius of the contour 30a. The hat stiffeners 20, 20a described above are merely illustrative of a wide range of contoured, composite laminate stiffeners that may be fabricated using the disclosed method and apparatus.

Figure 3:
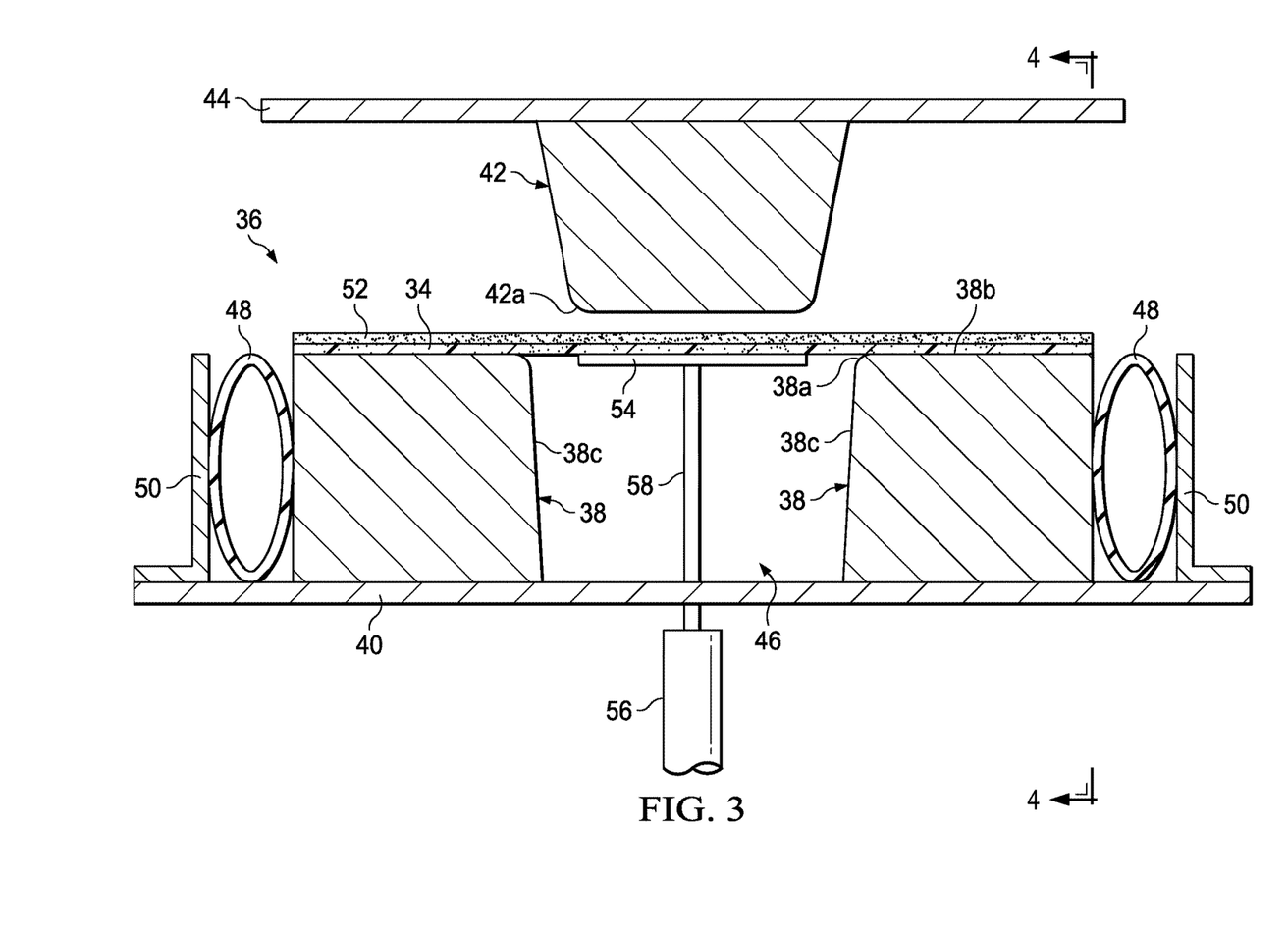
FIG. 3 is an illustration of a traverse, cross-sectional view of apparatus for punch forming the contoured composite hat stiffener shown in FIG. 1, illustrating setup of the die in preparation for performing a punch forming operation.
Figure 4:
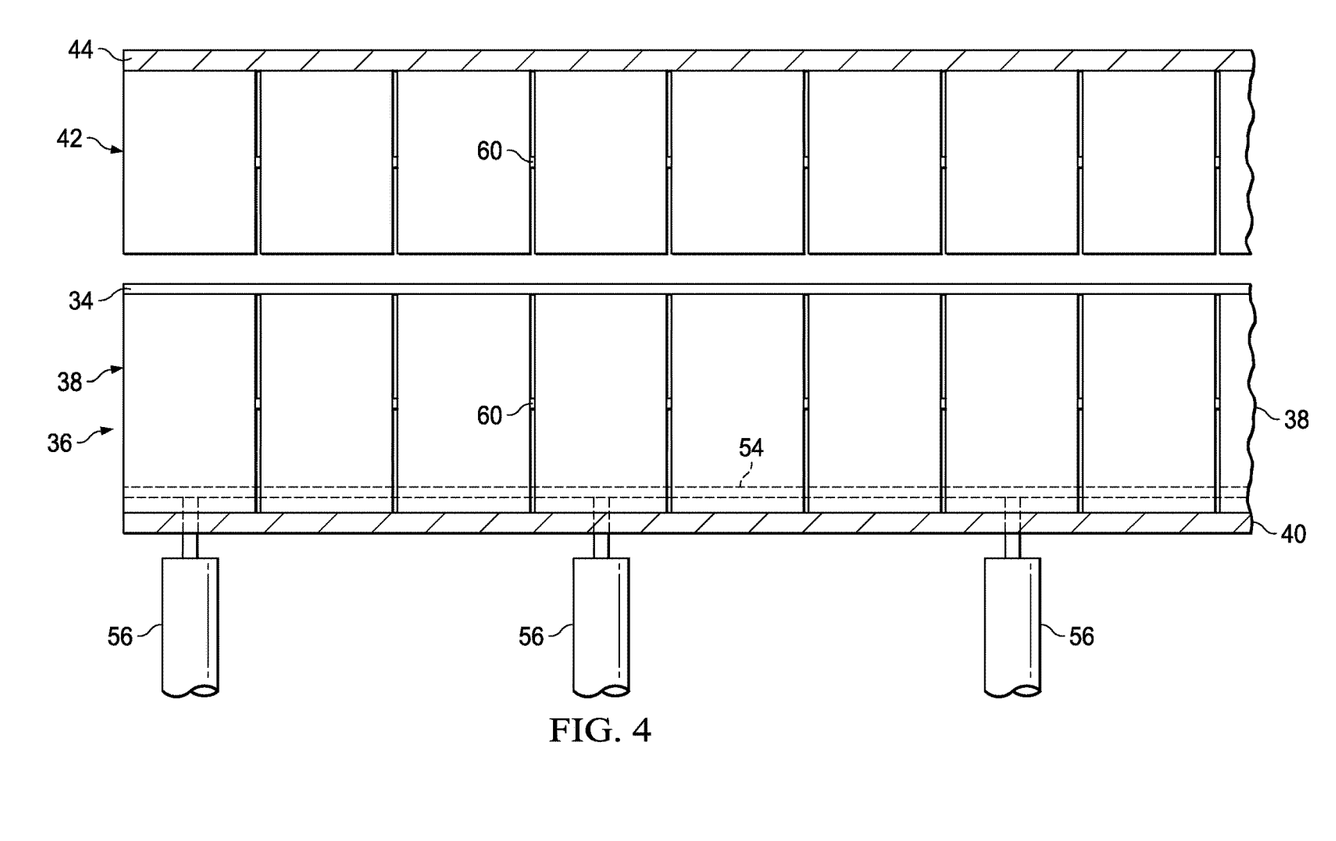
FIG. 4 is an illustration of a cross-sectional view taken along the line 4-4 in FIG. 3.
Figure 9:
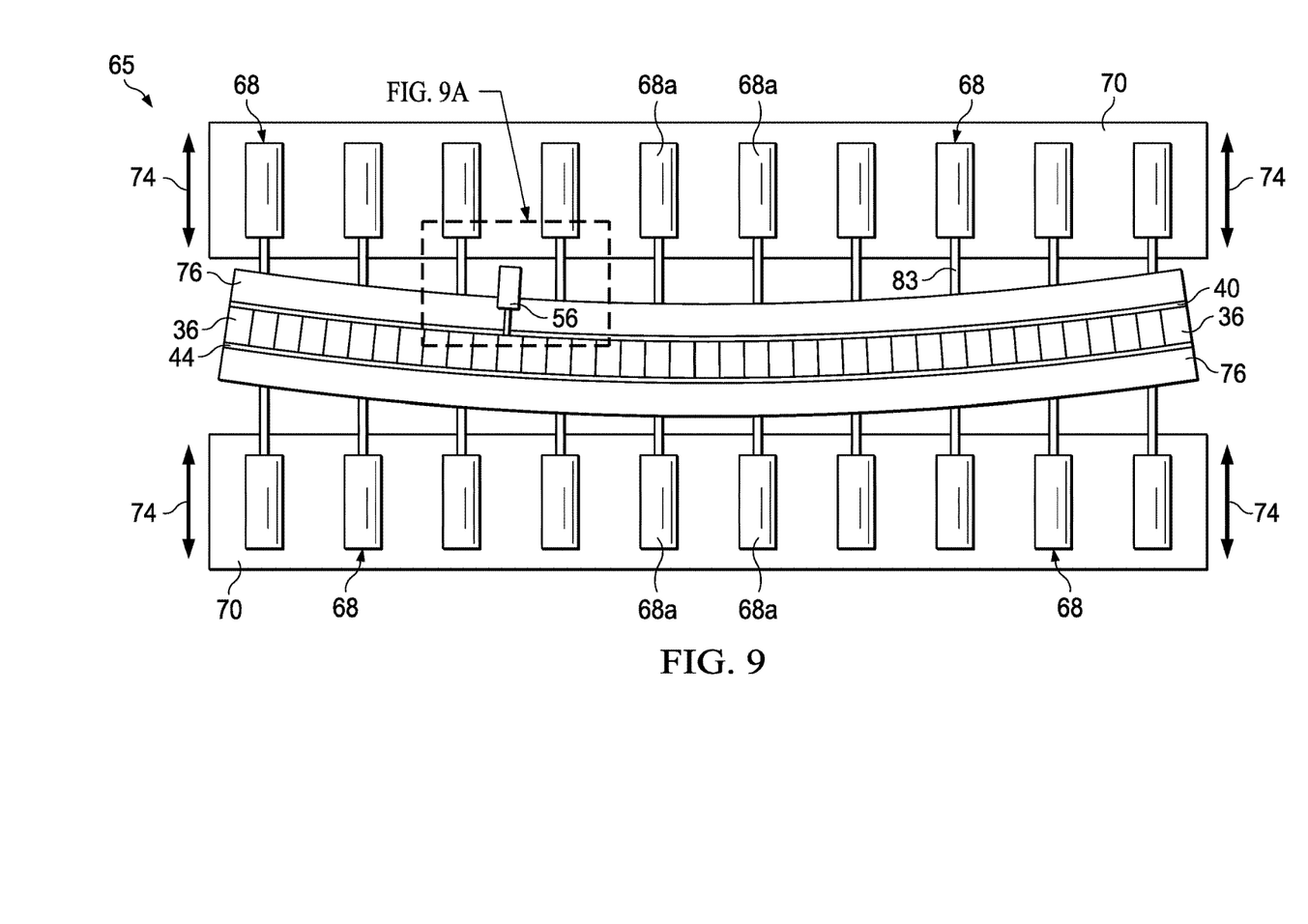
FIG. 9 is an illustration of a side view of a contour forming device used to contour the punch formed hat stiffener, only one of the pressure plate cylinders shown for clarity.

Attention is now directed to FIGS. 3 and 4 which illustrate an apparatus for fabricating composite laminate stiffeners, such as the contoured composite laminate stiffeners 20, 20a, respectively shown in FIGS. 1 and 2. The apparatus broadly comprises a punch 42 attached to an upper flexible plate 44, and a die 36 mounted on a lower flexible plate 40. The plates 40, 44 are forced together, driving the punch 42 into the die 36, by a machine such as a press (not shown) in which the plates 40, 44 are interposed between two later discussed press platens 70 (FIG. 9). As best seen in FIG. 4, both the die 36 and the punch 42 are segmented along their respective lengths. The segments of the die 36 and punch 42 are connected with each other by couplings 60, allowing each of the die 36 and punch 42 to flex and bend along their lengths. The die 36 comprises a pair of spaced apart die members 38 defining a die cavity 46 therebetween within which the webs 22 and cap 24 of the stiffeners 20, 20a may be formed in a punch forming operation described below. Each of the die members 38 includes an outside radius edge 38a for forming the radius corners 33 of the stiffener 20, 20a, and the punch includes outside radius edges 42a for forming the radius corners 31 of the stiffener 20, 20a.

Inflatable bladders, which may comprise inflatable hoses 48, are captured between the die members 38 and outside angle members 50 that are secured to the lower plate 40. Pressurization of the hoses 48 causes lateral pressure to be applied to the die members 38 which biases the die members 38 to move toward each other. A substantially flat, flexible pressure plate 54 is attached to the upper end of the output rods 58 of a plurality of pneumatic or hydraulic pressure plate cylinders 56, or similar motorized force applicators. The cylinders 56 are distributed along the length of the apparatus, as best seen in FIG. 4 in order to apply a substantially uniform pressure to the pressure plate 54 along its length. The piston rods 58 extend through the lower plate 40 into the die cavity 46. The pressure plate extends substantially parallel to the bottom of the punch 42 and is vertically displaceable within the die cavity 46 by the cylinders 56.

FIG. 3 shows the apparatus setup in preparation for a forming operation in which the cross-sectional shape of the stiffener 20 is punch formed. A generally flat composite charge 34 is placed on the die 36, overlying the upper surfaces 38b of the die members 38. Intermediate portions of the composite charge 34 are supported on the pressure plate 54 which is displaced upwardly to a position where it is substantially parallel with upper surfaces 38b of the die members 38. A heating blanket 52 may be placed over the composite charge 34 in order to heat the composite charge 34 to its forming temperature prior to commencement of a forming operation. Other forms of heating devices, such as infrared lamps or heated gas blowers (both not shown) may be used in lieu of the heating blanket 52 to heat the composite charge to its forming temperature. After heating the composite charge 34 to its forming temperature, the heating blanket is removed, and a punch forming operation is commenced.

Figure 5:
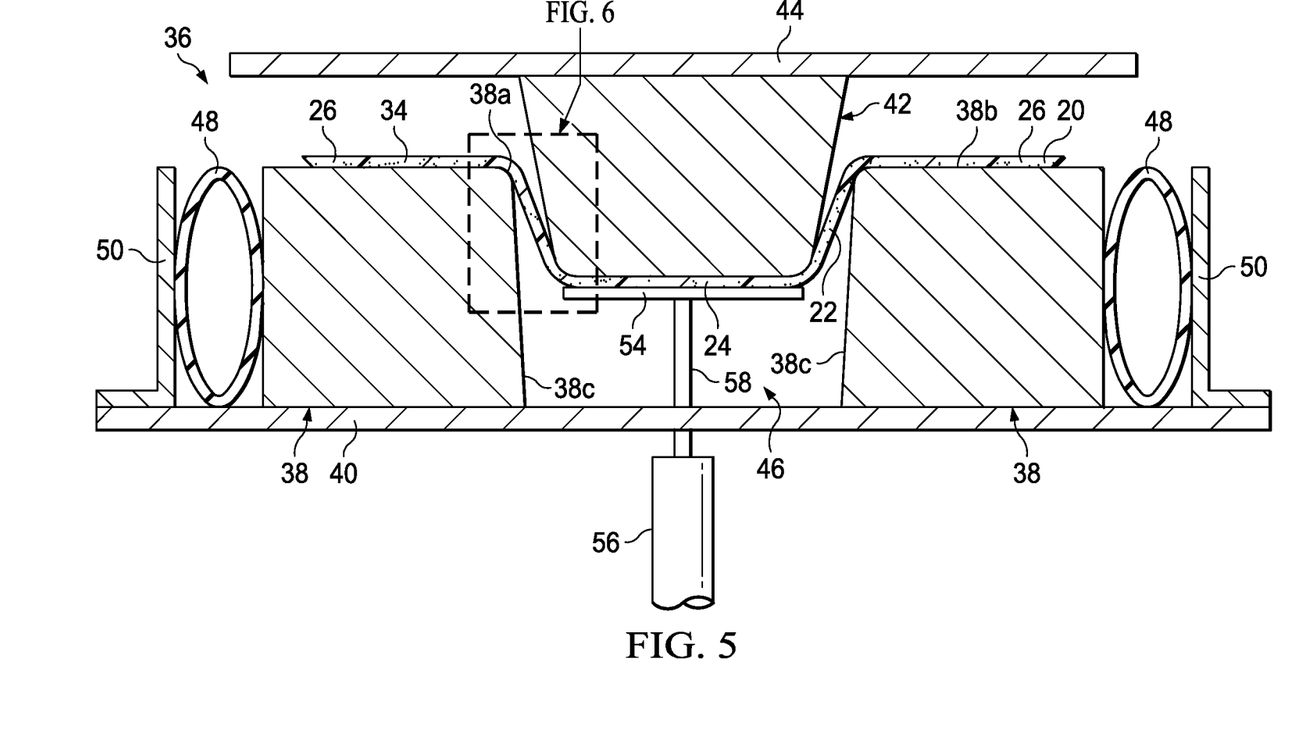
FIG. 5 is an illustration similar to FIG. 3 but showing the punch having partially formed the charge into the die.
Figure 6:
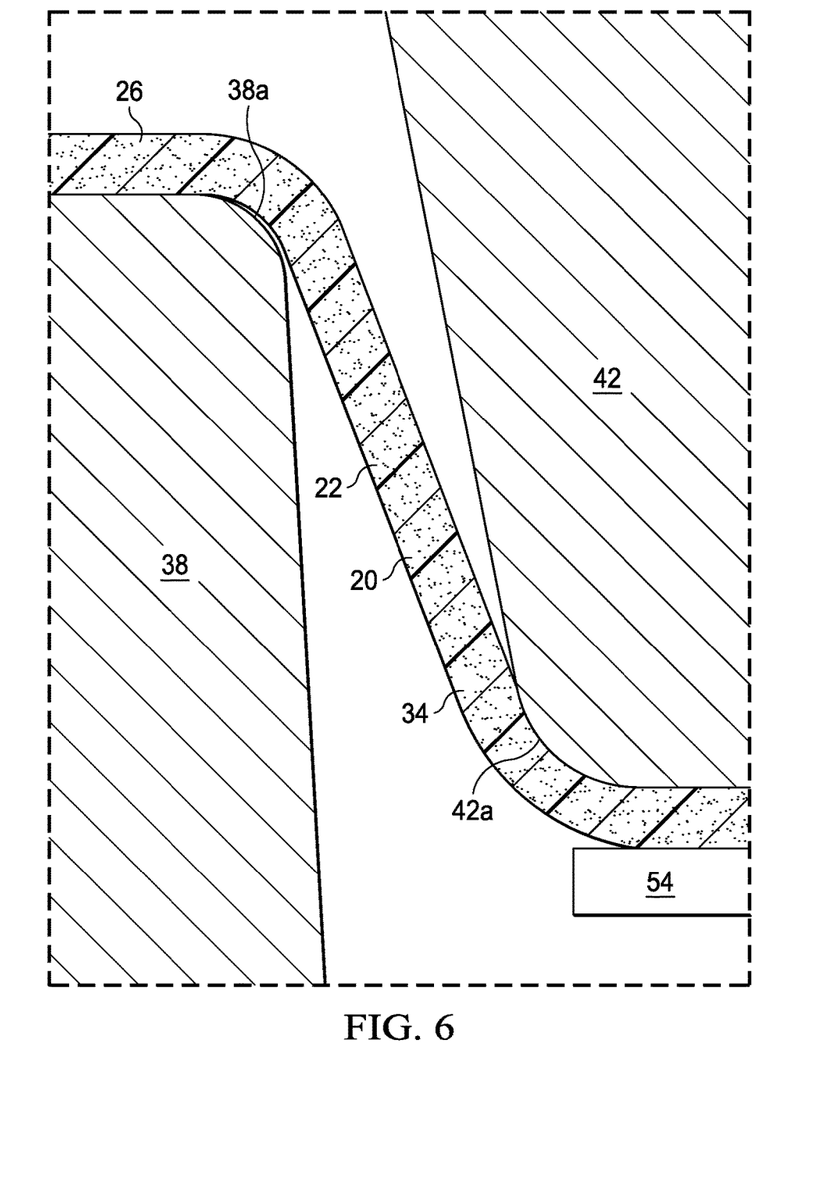
FIG. 6 is an illustration of the area designated as "FIG. 6" in FIG. 5.
Figure 7:
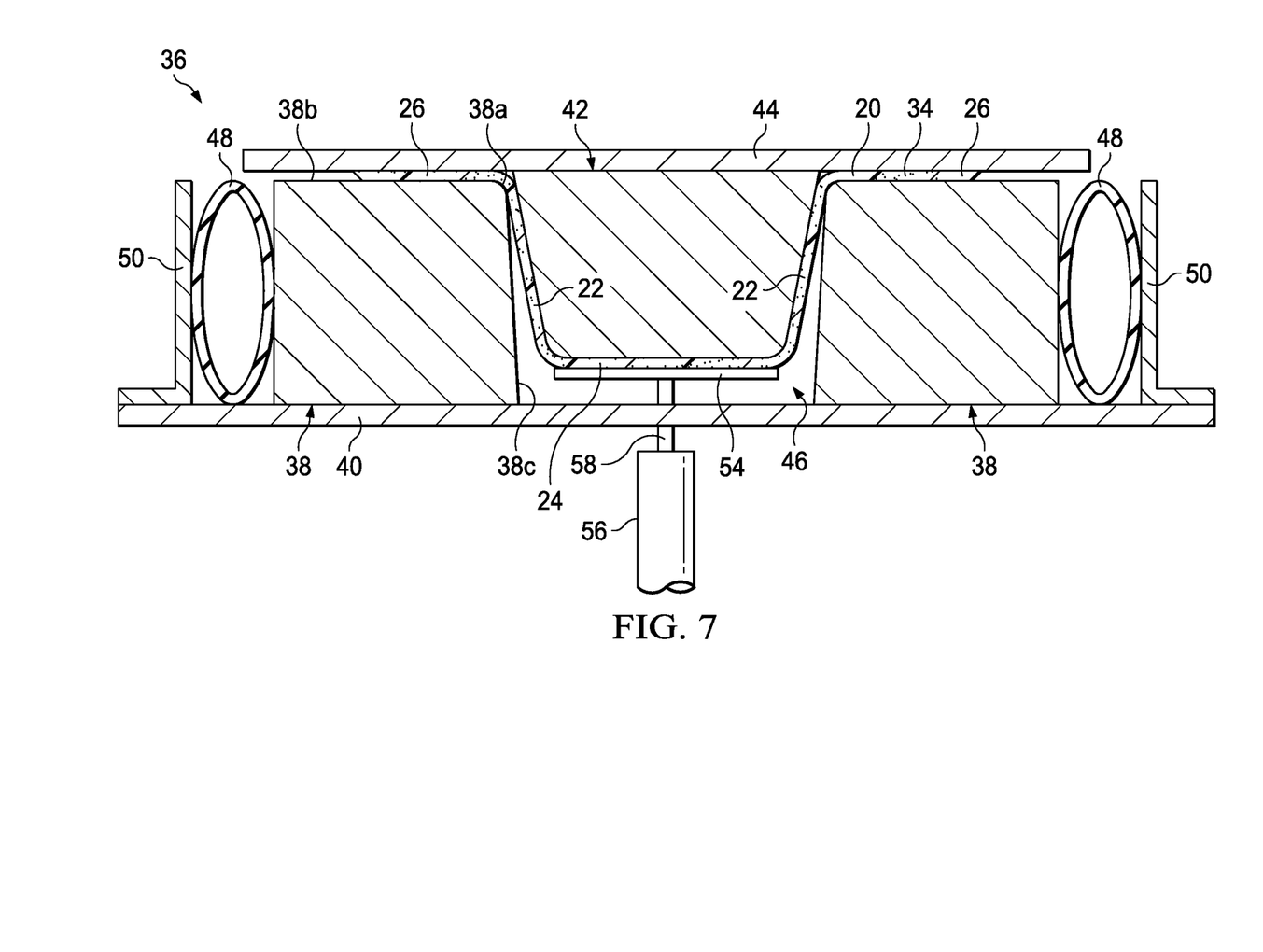
FIG. 7 is an illustration similar to FIG. 5 but showing the hat stiffener having been fully formed to the desired cross-sectional shape.

FIGS. 5 and 6 show the punch 42 partially displaced downwardly to begin driving and forming the composite charge 34 into the die cavity 46. The downward force applied by the punch 42 overcomes the upward force applied by the pressure plate 54 allowing the composite charge 34 to be formed between the punch 42 and the die members 38. The downward displacement of the punch 42 applies lateral forces on the die members 38 which overcomes the biasing forces applied by the hoses 48, causing the die members 38 to move away from each other. As best seen in FIG. 6, the punch 42 draws the composite charge 34 between the radius edges 38a, 42a of the die members 38 and punch 42 respectively. As the punch 42 descends into the die cavity 46, the upper plate 44 compresses the outer edges of the composite charge 34 against the upper surfaces 38b of the die members 38, thereby forming the flanges 26. FIG. 7 shows the punch having fully descended into the die cavity 46 to complete forming of the cross-sectional shape of the stiffener 20.

Figure 8:
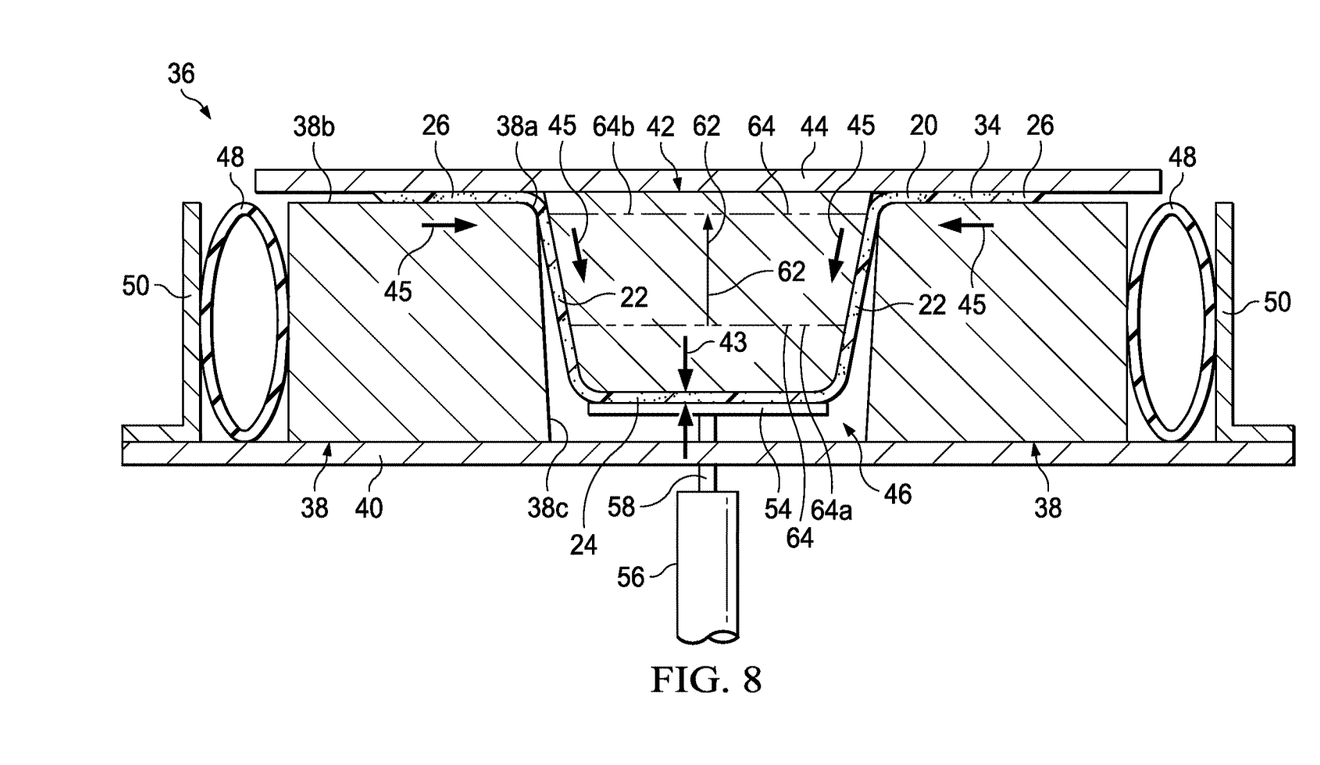
FIG. 8 is an illustration similar to FIG. 7 but showing a pressure plate compressing the cap against the punch to shift the neutral axis of the shaped stiffener and thereby place the webs and flanges in tension.

Referring now to FIG. 8, with the cross-sectional shape of the straight stiffener 20 having been formed, the cylinders 56 apply force to the pressure plate 54, causing the pressure plate 54 to apply pressure to the cap 24, thereby pinching the cap 24 between the pressure plate 54 and the punch 42. The compression 43 of the cap 24 by the pressure plate 54 shifts 62 the neutral axis 64 of the stiffener 20, 20a from the position shown at 64a to the position shown at 64b. The neutral axis 64 is the location on the cross section of the stiffener 20, 20a at which the composite charge 34 is neither in tension or compression. Thus, shifting of the neutral axis 64 toward the cap 24 causes the webs 22 and flanges 26 to be placed in tension 45. As will be discussed below in more detail, tensioning of the webs 22 and the flanges 26 in this manner during the subsequent contour forming operation reduces or eliminates ply wrinkling in the formed charge 34.

Figure 9A:
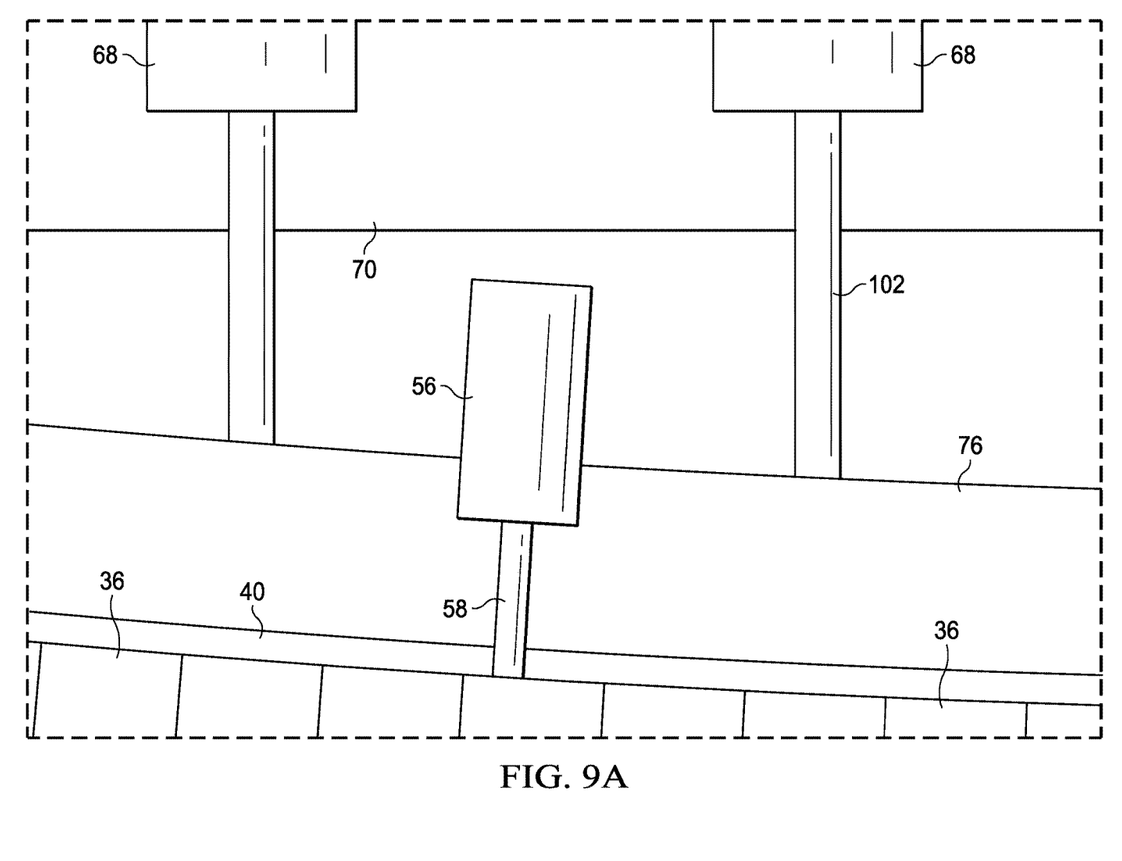
FIG. 9A is an illustration of the area designated as "FIG. 9A" in FIG. 9.

FIGS. 9 and 9A illustrate a device 65 which may comprise, without limitation, a press 65 or similar device for forming a contour in the straight stiffener 20 that has been punch formed to the desired cross sectional shape, as described above in connection with FIGS. 3-8. In this example, the stiffener 20 is formed with a concave contour 30 in the YZ plane (FIG. 1). The press 65 may also be employed for forming a stiffener 20a with a convex contour 30a. The die 36, which is sandwiched between the lower and upper plates 40, 44 (the punch 42 not shown) of the press 65, is positioned between two opposing sets of force applicators, such as pneumatic cylinders 68 or motor members that are mounted on platens 70 of the press 65 or similar platforms that are adapted to move 74 toward and away from each other.

The pneumatic cylinders 68, or similar force generators, are arranged in opposing pairs and have displaceable piston rods 83 that are connected to the upper and lower plates 40, 44. The pressure plate cylinders 56 are distributed along the length of the die 36 as previously discussed in connection with FIG. 4, although only one is shown in FIGS. 9 and 9A for clarity of illustration. The pressure plate cylinders 56 are mounted on two support structures 76 which may be flexible or segmented, and are respectively attached to the upper flexible plates 40, 44. As previously mentioned, the piston rods 58 (FIG. 9A) extend through the plates 40, 44 into the die cavity 46 (FIG. 8) and are respectively connected to the pressure plates 54.

In one embodiment, the length of the piston rods 83 is adjusted to match the desired contour to be formed, and the platens 70 are moved toward each other in order to apply the force needed to bend the die 36 and the punch 42, and thus the composite stiffener 20, to the desired contour. In other embodiments, the platens 70 may be initially adjusted to a desired spacing, and the pneumatic cylinders 68 may be employed to apply the force necessary to bend the die 36 and punch 42 to the desired contour. As the die 36 is bending to the desired contour in the XY plane, the cap 24 remains compressed by the pressure plates 54 to maintain the webs 22 and flanges 26 in tension, thereby preventing ply wrinkling that may be caused by the bending forces that are applied to the webs and flanges 26. Following the contouring operation, the stiffener 20 is allowed to cool to a temperature below the forming temperature, preferably to room temperature, while it remains held under pressure between the contoured punch 42 and die 36. By cooling the stiffener 20 while it remains in the contoured punch 42 and die 35, the desired shape of the stiffener 20 is maintained and does not distort due to material creep caused by resin which would otherwise remain slightly soft.

Figure 10:
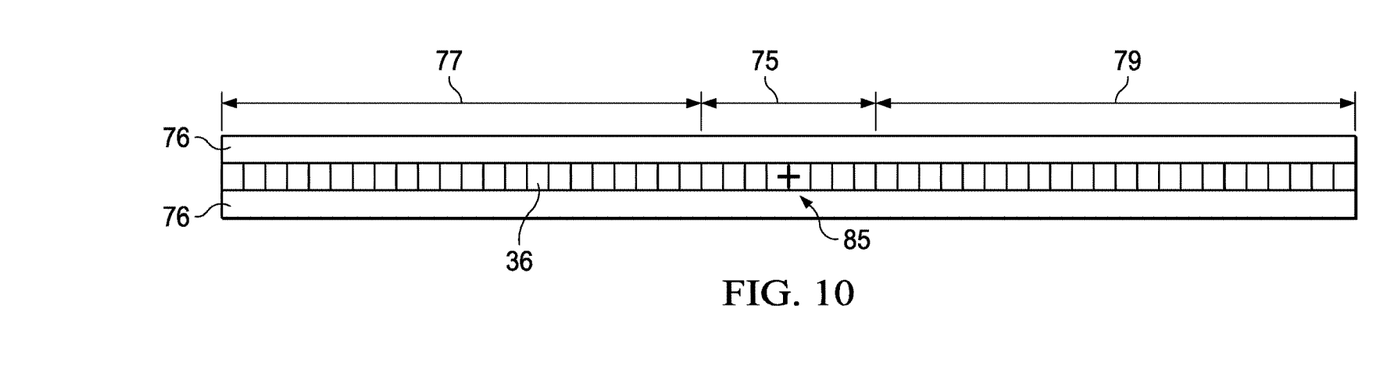
FIG. 10 is an illustration of a side view of the segmented die before a contour forming operation is commenced.
Figure 11:
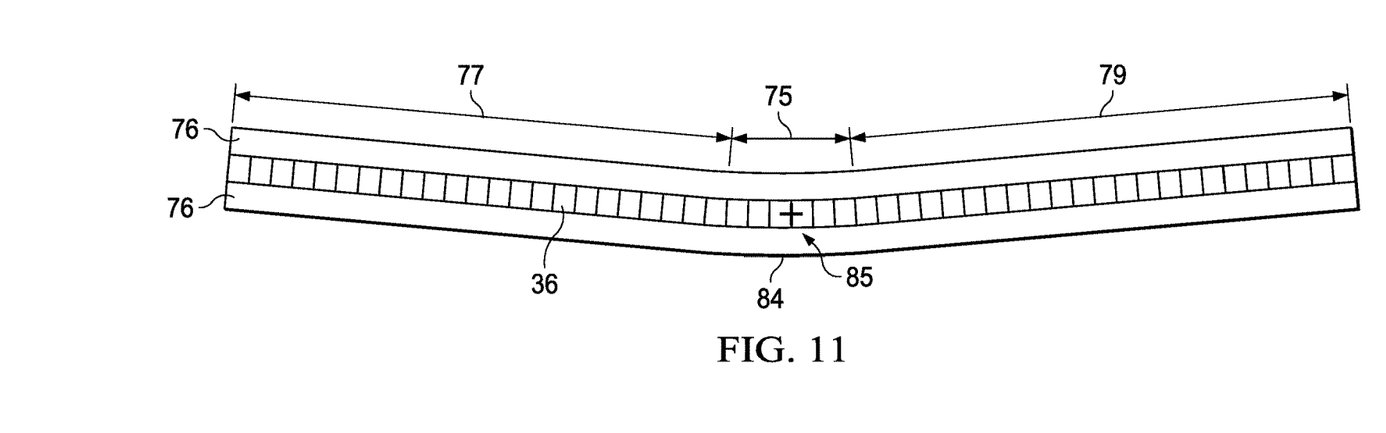
FIG. 11 is an illustration similar to FIG. 10, but showing initial contouring of an intermediate section of the segmented die at the apex of the contour.

Depending upon the degree of contour desired, the uncured plies of the composites laminate stiffener 20 may be subject to undesired bridging during the contouring process. In order to reduce or eliminate possible bridging, the contouring process may be carried out in a sequential manner, such that those sections of the stiffener 20 that are most likely to buckle are contoured first, before other sections are contoured. For example, referring now to FIGS. 10 and 11, stiffener 20 has a midpoint 85 corresponding to an apex 84 of the final contour 30 (FIG. 1) of the stiffener 20. The midpoint 85 or apex 84 lies within an intermediate section 75 of the straight stiffener 20. The remaining sections 77, 79 are located on opposite sides of the intermediate section 75. Referring particularly to FIG. 11, according to the disclosed method, potential ply bridging is reduced or eliminated by initially contouring only the intermediate section 75 which contains the apex 84 of the final stiffener contour 30. Then, having contoured the intermediate section 75, the remaining, outer sections 77, 79 may be contoured using the former shown in FIG. 9. In some embodiments, after the intermediate section 75 is contoured, remaining outer sections 77, 79 of the stiffener 20 may be sequentially contoured in a manner similar to that described immediately above.

Figure 12:
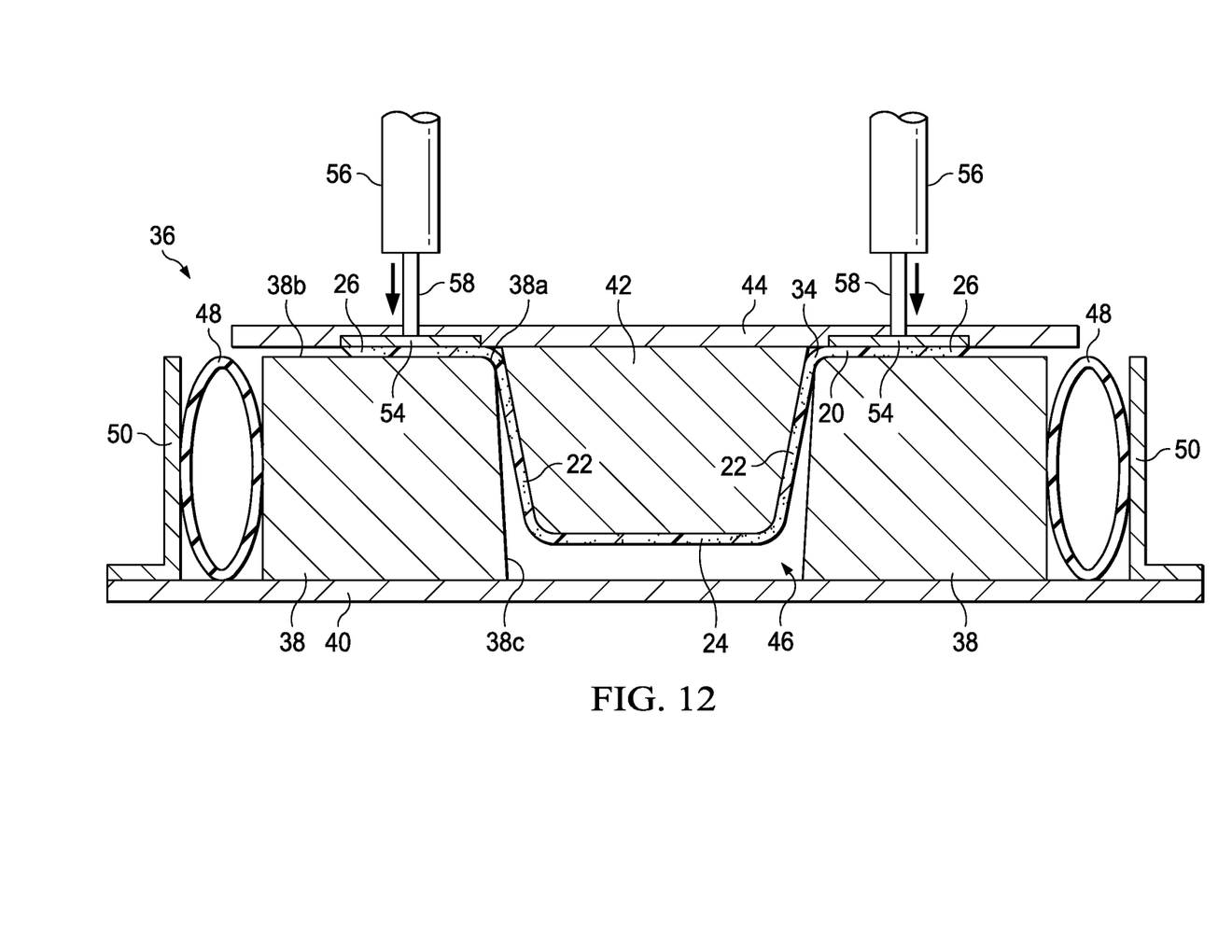
FIG. 12 is an illustration similar to FIG. 8, but showing an alternate embodiment of apparatus for reducing ply wrinkling during forming of the convex shaped composite hat stiffener shown in FIG. 2.

From the discussion above in connection with FIGS. 3-11, it may be appreciated that ply wrinkling during contouring of a straight composite laminate stiffener 20 may be reduced or eliminated by placing those portions of the stiffener 20 subject to wrinkling in tension, achieved by placing another portion of the stiffener 20 in compression. In the case of the concave shaped stiffener 20 shown in FIG. 1, the cap 24 is compressed to maintain the webs 22 and flanges 26 in tension during the contouring process. A similar method may be employed to avoid ply wrinkling when contouring a straight stiffener into the convex shape shown in FIG. 2. For example, referring now to FIG. 12, a die 36 and punch 42 arrangement similar to that previously described, are employed to form a substantially flat composite laminate charge 34 into a straight hat stiffener that is subsequently contoured into the convex shaped stiffener 20a shown in FIG. 2. A pair of pressure plates 54 recessed into the bottom of the upper plates 44 are connected to piston rods 58 of a series of pneumatic cylinders 56 distributed along the length of the plate 44. After the composite charge 34 is formed into the desired cross sectional shape, the flanges 26 are compressed by the pressure plates 54. Compression of the flanges 26 in turn places the webs 22 and cap 24 in tension. With the webs 22 and cap 24 held in tension, the straight stiffener 20a may be contoured into a desired convex shape using the contour former shown in FIG. 9.

Figure 13:
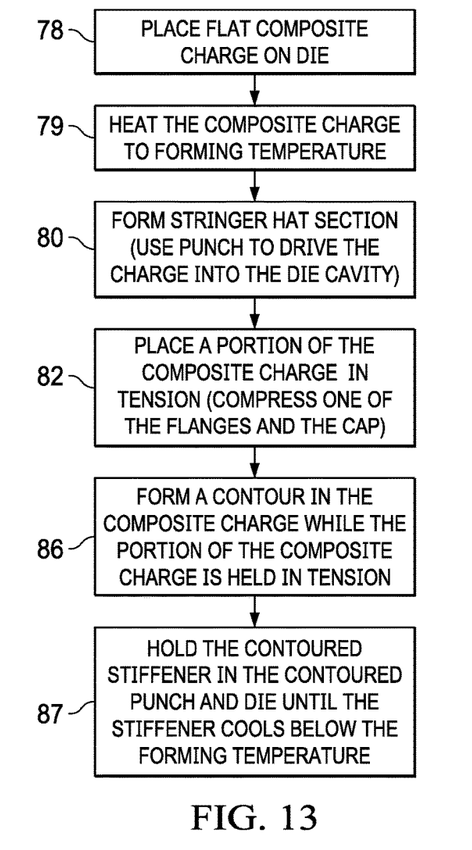
FIG. 13 is an illustration of a flow diagram of a method of forming a hat-shaped composite stiffener contoured along its length.

FIG. 13 broadly illustrates the overall steps of one method for forming a contoured, hat-shaped composite stiffener 20. Beginning at 78, a flat composite laminate charge 34 is placed on the die 36, and at 79, the charge 34 is heated to at least its forming temperature. At 80, a straight stiffener 20 having a hat shaped section is formed using a punch 42 to drive the charge 34 into a cavity 46 in the die 36. At 82, a portion of the composite charge 34 is placed in tension by compressing another portion of the charge 34, such as the flanges 26 or the cap. At 86, a contour is formed in the composite charge 34 while the portion of the composite charge 34 is held in tension throughout the contouring process. At 87, the contoured stiffener 20 is held in the contoured die 36 and punch 42 until the stiffener 20 cools to a temperature that is below the forming temperature, and preferably room temperature to avoid creep of the stiffener shape when it is removed from the punch 42 and die 36.

Figure 14:
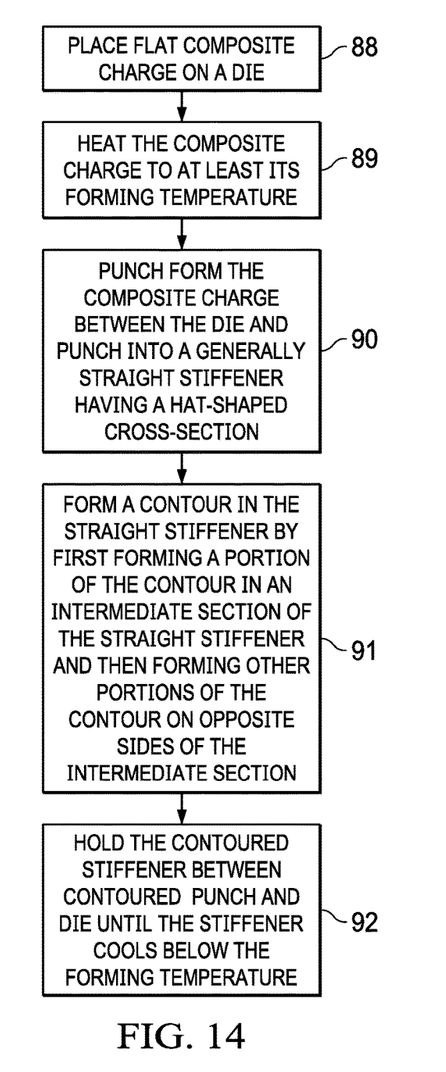
FIG. 14 is an illustration of a flow diagram of another method of forming a hat shaped composite stiffener contoured along its length.

Attention is now directed to FIG. 14 which broadly illustrates the overall steps of an alternate method of forming the contoured, hat-shaped composite stiffener 20. Beginning at 88, a flat composite charge 34 is placed on the die 36, and at 89, the charge 36 is heated to at least its forming temperature using a heating blanket 52 or other suitable heating devices. At 90, the composite charge 34 is punch formed between the die 36 and the punch 42 into a generally straight stiffener 20 having a hat-shaped cross-section. At 91, a contour is formed in the straight stiffener 20 by first forming a portion of the contour in an intermediate section of the stiffener, and then forming other portions of the contour on opposite sides of the intermediate section. At 92, following contouring, the charge 34 is held in the contoured die 36 and punch 42 until the stiffener cools to below its forming temperature, and preferably to room temperature to avoid possible creep of the stiffener shape when it is removed from the punch 42 and die 36.

Figure 15:
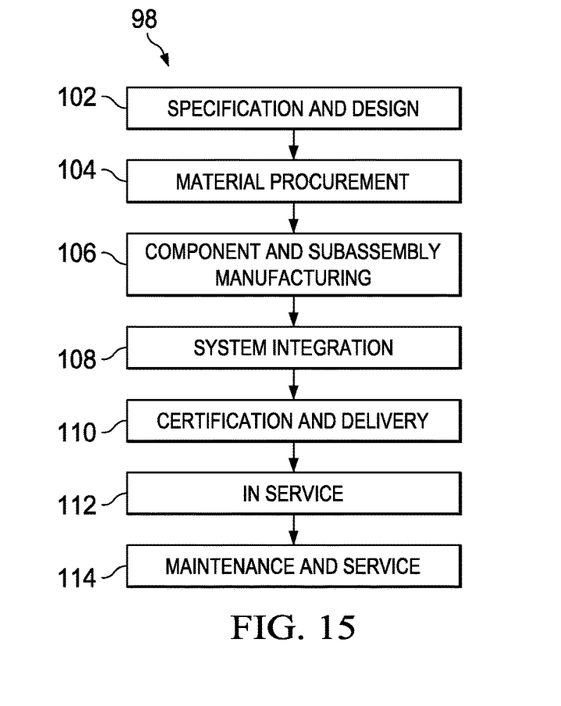
FIG. 15 is an illustration of a flow diagram of aircraft production and service methodology.
Figure 16:
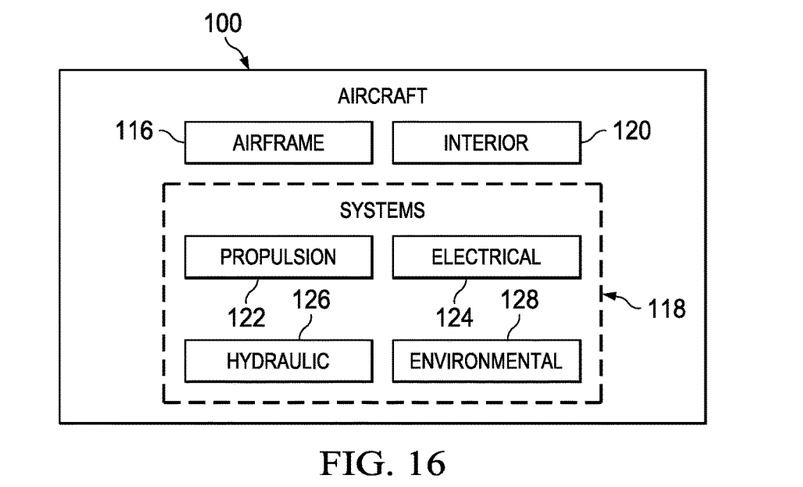
FIG. 16 is an illustration of a block diagram of an aircraft.

Embodiments of the disclosure may find use in a variety of potential applications, particularly in the transportation industry, including for example, aerospace, marine, automotive applications and other application where contoured elongate composite laminate stiffeners, such as stringers and spars, may be used. Thus, referring now to FIGS. 15 and 16, embodiments of the disclosure may be used in the context of an aircraft manufacturing and service method 98 as shown in FIG. 15 and an aircraft 100 as shown in FIG. 16. Aircraft applications of the disclosed embodiments may include, for example, without limitation, contoured stringers, spars and similar structural members. During pre-production, exemplary method 98 may include specification and design 102 of the aircraft 100 and material procurement 104. During production, component and subassembly manufacturing 106, and system integration 108 of the aircraft 100 takes place. Thereafter, the aircraft 100 may go through certification and delivery 110 in order to be placed in service 112. While in service by a customer, the aircraft 100 is scheduled for routine maintenance and service 114, which may also include modification, reconfiguration, refurbishment, and so on.

Each of the processes of method 98 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 100 produced by exemplary method 98 may include an airframe 116 with a plurality of systems 118 and an interior 120. Examples of high-level systems 118 include one or more of a propulsion system 122, an electrical system 124, a hydraulic system 126, and an environmental system 128. Any number of other systems may be included. Although an aerospace example is shown, the principles of the disclosure may be applied to other industries, such as the marine and automotive industries.

Systems and methods embodied herein may be employed during any one or more of the stages of the production and service method 98. For example, components or subassemblies corresponding to production process 98 may be fabricated or manufactured in a manner similar to components or subassemblies produced while the aircraft 100 is in service. Also, one or more apparatus embodiments, method embodiments, or a combination thereof may be utilized during the production stages 106 and 108, for example, by substantially expediting assembly of or reducing the cost of an aircraft 100. Similarly, one or more of apparatus embodiments, method embodiments, or a combination thereof may be utilized while the aircraft 100 is in service, for example and without limitation, to maintenance and service 114.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a contoured hat-shaped composite stiffener, comprising:
    placing a composite charge that is generally flat on a die having a die cavity, wherein the composite charge rests on top of a pressure plate that is supported by a piston rod, wherein the piston rod is directly connected to a cylinder;
    driving the composite charge into the die cavity with a punch to form a hat-shaped stiffener, comprising a cap, a pair of flanges, and a pair of webs connecting the pair of flanges to the cap;
    placing a portion of the hat-shaped stiffener in tension by compressing the cap between the pressure plate and the punch, wherein a first surface of the cap contacts the pressure plate and a second surface of the cap contacts the punch, wherein a neutral axis of the hat-shaped stiffener shifts away from the pressure plate; and
    forming a contour along a longitudinal axis in the hat-shaped stiffener while the cap is compressed between the pressure plate and the punch to form the contoured hat-shaped composite stiffener.

2. The method of claim 1, wherein forming a contour in the hat shaped stiffener includes bending the hat-shaped stiffener into a concave shape having an inside radius defined by the cap.

3. The method of claim 1, wherein compressing the cap is performed by forcing the hat-shaped stiffener against an end of the punch.

4. The method of claim 3, wherein forcing the hat-shaped stiffener against the end of the punch is performed using the pressure plate to force the hat-shaped stiffener against the punch.

5. The method of claim 1, wherein forming a contour in the hat-shaped stiffener includes:
   initially forming a first portion of the contour in an intermediate section of the hat-shaped stiffener; and
   forming other portions of the contour in remaining sections of the hat-shaped stiffener after the first portion of the contour has been formed in the intermediate section.

6. A method of forming a hat-shaped composite stiffener contoured along its length, comprising:
   placing a composite charge that is generally flat on a die, wherein the composite charge rests on top of a pressure plate that is supported by a piston rod, wherein the piston rod is directly connected to a cylinder;
   punch forming the composite charge between the die and a punch into the hat-shaped composite stiffener, wherein the hat-shaped composite comprises, a cap, a pair of flanges, and a pair of webs connecting the pair of flanges to the cap;
   placing a portion of the hat-shaped composite stiffener in tension by compressing the cap between the pressure plate and the punch, wherein a first surface of the cap contacts the pressure plate and a second surface of the cap contacts the punch, wherein a neutral axis of the hat-shaped composite stiffener shifts away from the pressure plate; and
   stiffener; and
   forming a contour along a longitudinal axis in the hat-shaped composite stiffener, while the cap is compressed, by first forming a portion of the contour in an intermediate section of the hat-shaped composite stiffener and then forming other portions of the contour on opposite sides of the intermediate section.

7. The method of claim 6, wherein
   the contour has an apex; and
   the apex is located within the intermediate section.

8. The method of claim 6, wherein forming the other portions of the contour includes sequentially forming each of the other portions respectively along their lengths.

9. The method of claim 6 further comprising:
   heating the composite charge to a temperature of allowing the composite charge to be formed; and
   allowing the hat-shaped composite stiffener to cool before removing the hat-shaped composite stiffener from the die.

10. The method of claim 6, wherein forming a contour in the hat-shaped composite stiffener includes applying a bending force to the punch and die using opposing sets of force applying motors.

11. The method of claim 6, wherein placing a portion of the hat-shaped composite stiffener in tension further comprises:
   compressing a first flange from the pair of flanges and the cap; and
   wherein forming the contour is performed while the portion of the hat-shaped composite stiffener is being held in tension.

12. A method of forming a contoured hat-shaped composite stiffener, comprising:
   placing a composite charge that is generally flat on a die having a die cavity, wherein the composite charge rests on top of a pressure plate that is supported by a piston rod, wherein the piston rod is directly connected to a cylinder;
   forming a hat-shaped stiffener using a punch to drive the composite charge into the die cavity, wherein the hat-shaped stiffener comprises a cap, a pair of flanges, and a pair of webs connecting the cap with the pair of flanges;
   placing a portion of the hat-shaped stiffener in tension by compressing the pair of flanges using a pair of pressure plates connected to pneumatic cylinders; and
   forming a contour along a longitudinal axis in the hat-shaped stiffener while the portion of the hat-shaped stiffener is being held in tension.

13. The method of claim 12, wherein forming a contour along the longitudinal axis in the hat-shaped stiffener comprises bending the hat-shaped stiffener along the longitudinal axis into a convex shape having an inside radius defined by the pair of flanges.

* * * * *